United States Patent
Gergis (10) Patent No.: US 9,739,349 B2
(45) Date of Patent: Aug. 22, 2017

(54) ACCESSORY MOUNTS FOR TENSIONING SYSTEMS

(71) Applicant: Mobile Climate Control, Corp., Goshen, IN (US)

(72) Inventor: Adel L. Z. Gergis, North York (CA)

(73) Assignee: Mobile Climate Control Corp., Goshen, IN (US)

( * ) Notice: Subject to any disclaimer, the term of this patent is extended or adjusted under 35 U.S.C. 154(b) by 114 days.

(21) Appl. No.: 14/818,617

(22) Filed: Aug. 5, 2015

(65) Prior Publication Data

US 2016/0040759 A1 Feb. 11, 2016

Related U.S. Application Data

(60) Provisional application No. 62/033,982, filed on Aug. 6, 2014.

(51) Int. Cl.
*F16H 7/12* (2006.01)
*F16H 7/18* (2006.01)
*F16H 7/20* (2006.01)
*F16H 7/08* (2006.01)

(52) U.S. Cl.
CPC ............ *F16H 7/1281* (2013.01); *F16H 7/08* (2013.01); *F16H 7/12* (2013.01); *F16H 7/18* (2013.01); *F16H 7/20* (2013.01); *F16H 2007/088* (2013.01); *F16H 2007/0865* (2013.01); *F16H 2007/0891* (2013.01); *F16H 2007/0893* (2013.01)

(58) Field of Classification Search
CPC ....................... F16H 7/1281; F16H 2007/0865
USPC .......................................................... 474/89
See application file for complete search history.

(56) References Cited

U.S. PATENT DOCUMENTS

| | | | |
|---|---|---|---|
| 2,909,074 A | 10/1959 | Scheiterlein | |
| 3,385,123 A * | 5/1968 | Glaser ................. | B41F 13/0008 474/27 |
| 4,832,661 A * | 5/1989 | Wagner ................ | H02K 7/1004 474/113 |
| 5,246,403 A * | 9/1993 | Uphaus ..................... | F16H 9/14 474/117 |
| 6,165,089 A * | 12/2000 | McGreal ............... | F16H 7/1263 474/101 |
| 6,932,730 B2 * | 8/2005 | Borling ..................... | F16H 9/14 474/101 |
| 2012/0208661 A1 | 8/2012 | Lavigne et al. | |

FOREIGN PATENT DOCUMENTS

| | | |
|---|---|---|
| DE | 2523425 A1 | 12/1975 |
| GB | 1460628 A | 1/1977 |

OTHER PUBLICATIONS

Extended European Search Report dated Feb. 4, 2016, relating to European Application No. 15179971.5-1752 /2988021, 8 pages.

* cited by examiner

*Primary Examiner* — William E Dondero
*Assistant Examiner* — Mark K Buse
(74) *Attorney, Agent, or Firm* — Barnes & Thornburg LLP (57) ABSTRACT

A tensioning system includes a drive assembly, an accessory mount coupled with the drive assembly, and an accessory system coupled with the accessory mount. The accessory mount is arranged to apply tension to at least one of the drive assembly and the accessory system.

19 Claims, 9 Drawing Sheets

ACCESSORY MOUNTS FOR TENSIONING SYSTEMS

This application claims priority and the benefit of U.S. Provisional Patent Application No. 62/033,982; filed 6 Aug. 2014, the disclosure of which is now incorporated herein by reference.

FIELD OF THE DISCLOSURE

The present disclosure relates generally to accessory mounts for use with tensioning systems, and more specifically to accessory mounts for tensioning systems included in a vehicle.

BACKGROUND

Accessory mounts may be used to apply tension to a system. As an example, some accessory mounts are used to apply tension to belts that transmit power from a power source to an accessory unit. Some vehicles include a tensioning system having a power source such as, for example, an engine or a motor, an accessory unit such as, for example, an alternator or a compressor, and an accessory mount to support the accessory unit and to transmit rotational energy from the power source to the accessory unit.

Tensioning systems may comprise a belt drive system. Belt drive systems typically include a plurality of pulleys and a plurality of belts that couple together the pulleys. In some belt drive systems, one or more of the components are movable such that belts may be assembled around the pulleys while tension in each belt is minimized. After the belts are assembled around the pulleys, the components are moved apart to apply a desired tension to the belts.

The components may need to be moved apart with precision which may increase the assembly time and/or increase the risk of damage such as, for example, damage caused by misalignment of the pulleys. Alternatively, the components may be relatively difficult to move and, as a result, may not be moved properly during assembly. The belts may then be forced onto the pulleys which may cause damage to the belts and/or result in a less than desired tension being applied to the belts. Accordingly, there remains a need for further contributions in this area of technology, including contributions that reduce complexity and assembly time of applications.

SUMMARY

The present disclosure may comprise one or more of the following features recited in the attached claims and combinations thereof, and/or one or more of the following features and combination thereof.

In one aspect of the disclosure, an illustrative accessory mount is disclosed. Other embodiments include apparatuses, systems, devices, hardware, methods, and combinations for applying a tension to a tension system. Further embodiments, forms, features, aspects, benefits, and advantages of the present application shall become apparent from the description and figures provided herewith.

Various illustrative embodiments of a tensioning system including an accessory mount are provided. In one illustrative aspect, the tensioning system illustratively comprises a drive assembly, an accessory system, and a mount assembly. The drive assembly may include a drive pulley and a drive belt coupled with the drive pulley. The accessory system may have an input pulley assembly including an input pulley and an input belt coupled with the input pulley. The mount assembly may be coupled with the drive belt and the input belt. The mount assembly may be arranged to move relative to the drive pulley and the input pulley to maintain tension in the drive belt and the input belt.

Illustratively, the mount assembly includes a carriage, a pivot joint coupled with the carriage, and a floating arm pivotably coupled with the pivot joint. Illustratively, the floating arm is coupled with the drive belt and the input belt and the floating arm is arranged to pivot about a pivot axis included in the pivot joint to maintain tension in the drive belt and input belt.

Illustratively, the pivot joint includes a pivot axis, the floating arm is arranged to pivot about the pivot axis toward the drive pulley in response to a first force applied to the floating arm by the drive belt and to pivot about the pivot axis toward the input pulley in response to a second force applied to the floating arm by the input belt. Illustratively, the floating arm includes a longitudinal axis and an arm body. The longitudinal axis intersects with and extends away from the pivot axis. The arm body extends along the longitudinal axis and is arranged to pivot about the pivot axis.

Illustratively, the first force includes a first perpendicular portion that is perpendicular to the longitudinal axis. The second force includes a second perpendicular portion that is perpendicular to the longitudinal axis. The arm body is arranged to pivot about the pivot axis until the first perpendicular portion is equal to the second perpendicular portion.

Illustratively, the floating arm further includes an intermediate pulley assembly and a pulley-assembly passage formed in the arm body. The intermediate pulley assembly is coupled with the drive belt and the input belt. The pulley-assembly passage comprises an elongated slot extending along the longitudinal axis. The intermediate pulley assembly is arranged to move in the pulley-assembly passage between an inner position in which the intermediate pulley assembly is located in the pulley-assembly passage radially inward toward the pivot axis and an outer position in which the intermediate pulley assembly is located in the pulley-assembly passage radially outward away from the pivot axis.

Illustratively, the floating arm applies a relatively small tension to the drive belt and input belt when the input pulley assembly is in the inner position and a relatively large tension to the drive belt and input belt when the intermediate-pulley assembly is in the outer position.

Illustratively, the accessory system is coupled with carriage. Illustratively, the accessory system includes an accessory unit and the input pulley assembly coupled with the accessory unit and the input pulley assembly is arranged to receive rotational energy to power the accessory unit.

Illustratively, the input pulley assembly includes the input pulley, the input belt, and an input axis. The input pulley is coupled with the accessory unit. The input pulley is arranged to rotate about the input axis to power the accessory unit.

Illustratively, the pivot joint includes a pivot axis. The floating arm is coupled with the drive belt and the input belt. The floating arm is arranged to pivot about the pivot axis to maintain tension in the drive belt and input belt.

Illustratively, the arm body further includes an arm bracket extending along the longitudinal axis and a joint-receiver passage formed in the arm bracket. Illustratively, the pivot axis extends through the joint-receiver passage. Illustratively, the pivot axis is about perpendicular to the longitudinal axis. Illustratively, the arm body further includes a pulley-assembly passage formed in the arm bracket and an intermediate pulley assembly extending through the pulley-assembly passage.

Illustratively, the intermediate pulley assembly is coupled with the drive belt and the input belt. The intermediate pulley assembly is arranged to receive rotational energy from the drive pulley through the drive belt and to transmit the rotational energy to the input pulley through the input belt.

Illustratively, the intermediate pulley assembly includes an intermediate axis and an intermediate pulley arranged to rotate about the intermediate axis. The intermediate pulley is coupled with the drive belt and the input belt.

Illustratively, the arm body is arranged to pivot about the pivot axis toward the drive assembly in response to a first force applied to the intermediate pulley by the drive belt and to pivot about the pivot axis toward the input pulley assembly in response to a second force applied to the intermediate pulley by the input belt. Illustratively, the first force includes a first perpendicular portion that is perpendicular to the longitudinal axis. The second force includes a second perpendicular portion that is perpendicular to the longitudinal axis. The arm body is arranged to pivot about the pivot axis until the first perpendicular portion is equal to the second perpendicular portion. Illustratively, the first perpendicular portion is applied to the intermediate pulley in a first direction and the second perpendicular portion is applied to the intermediate pulley in a second direction that is opposite the first direction.

Illustratively, the intermediate pulley includes a first groove and a second groove spaced apart from the first groove along the intermediate axis. The first and second grooves extend circumferentially around the intermediate axis. The drive belt is received in the first groove and the input belt is received in the second groove.

Illustratively, the pulley-assembly passage comprises an elongated slot extending along the longitudinal axis. The intermediate pulley assembly is arranged to move in the pulley-assembly passage between an inner position in which the intermediate pulley assembly is located in the pulley-assembly passage radially inward toward the pivot axis and an outer position in which the intermediate pulley assembly is located in the pulley-assembly passage radially outward away from the pivot axis.

Illustratively, the floating arm applies a relatively small tension to the drive belt and input belt when the intermediate pulley assembly is in the inner position and a relatively large tension to the drive belt and input belt when the intermediate pulley assembly is in the outer position. Illustratively, the intermediate pulley assembly is movable to a selected position including the inner position, the outer position, and a plurality of positions therebetween. Illustratively, the floating arm further includes a pulley-assembly retainer coupled with the intermediate pulley assembly and the pulley-assembly retainer is arranged to block selectively movement of the intermediate pulley assembly away from the selected position.

Illustratively, the pulley-assembly retainer comprises a fastener coupled with the intermediate pulley assembly. Illustratively, the fastener engages the arm bracket to block radial movement of the intermediate pulley assembly and disengages the arm bracket to allow radial movement of the intermediate pulley assembly.

Illustratively, the pulley-assembly retainer comprises a rod, a pulley axel, and a fastener. Illustratively, the rod extends along the longitudinal axis and is coupled with the arm body and the pulley axel. The pulley axel is coupled with the intermediate pulley assembly and the rod. The intermediate pulley assembly is arranged to move radially with the pulley axel relative to the pivot axis. The intermediate pulley assembly is arranged to rotate relative to the pulley axel and the arm body. The fastener blocks selectively radial movement of the pulley axel along the longitudinal axis.

Also provided is an illustrative embodiment of an accessory mount for use with a tensioning system. The accessory mount may comprise a carriage, a pivot joint coupled with the carriage, and a floating arm. The floating arm may be coupled with the pivot joint. The floating arm may be arranged to couple with a first and a second belt of the tensioning system and to pivot relative to the pivot joint to apply a tension to the first and second belts.

Also provided is an illustrative method of using the illustrative accessory mount according to any of the illustrative embodiments disclosed herein in a tensioning system. The method may comprise the step of providing a drive assembly, an accessory mount, and an accessory system coupled with the accessory mount. The accessory mount may include a pivot joint and a floating arm. The floating arm may include an arm body coupled with the pivot joint to pivot about a pivot axis of the pivot joint and an intermediate pulley assembly extending through the arm body. The method may further comprise the step of coupling a drive belt with a drive pulley of the drive assembly and the intermediate pulley assembly. The method may further comprise the step of coupling an input belt with the accessory system and the intermediate pulley assembly. The method may further comprise the step of pivoting the arm body about the pivot axis to cause the intermediate pulley assembly to apply a desired tension to the drive belt and the input belt.

Illustratively, the arm body is formed to include a pulley-assembly passage. The intermediate pulley assembly extends through the pulley-assembly passage. The intermediate pulley assembly is movable in the pulley-assembly passage between an inner position in which the intermediate pulley assembly is located in the pulley-assembly passage radially toward the pivot axis and an outer position in which the intermediate pulley assembly is located in the pulley-assembly passage radially away from the pivot axis.

Illustratively, the method may further comprise moving the intermediate pulley assembly from the inner position toward the outer position to change the tension applied to the drive belt and input belt. Illustratively, the intermediate pulley assembly is moved from the inner position toward the outer position to increase the tension in the drive belt and input belt. Illustratively, the method may further comprise blocking radial movement of the intermediate pulley assembly relative to the pivot axis.

These and other features of the present disclosure will become more apparent from the following description of the illustrative embodiments.

Corresponding reference characters indicate corresponding parts throughout the several views. Although the drawings represent embodiments of the present invention, the drawings are not necessarily to scale and certain features may be exaggerated in order to better illustrate and explain the present invention.

DETAILED DESCRIPTION OF THE DRAWINGS

For the purposes of promoting an understanding of the principles of the invention, reference will now be made to a number of illustrative embodiments shown in the attached drawings and specific language will be used to describe the same. While the concepts of this disclosure are described in relation to a mount assembly for mounting an alternator in a bus, it will be understood that they are equally applicable to other accessory devices such as, for example, air conditioner units as well as to other tensioning systems such as, for example, motors or motor vehicles generally. Further, the concepts of this disclosure are similarly applicable for use in applications where it is desirable to drive an accessory unit.

Figure 1:
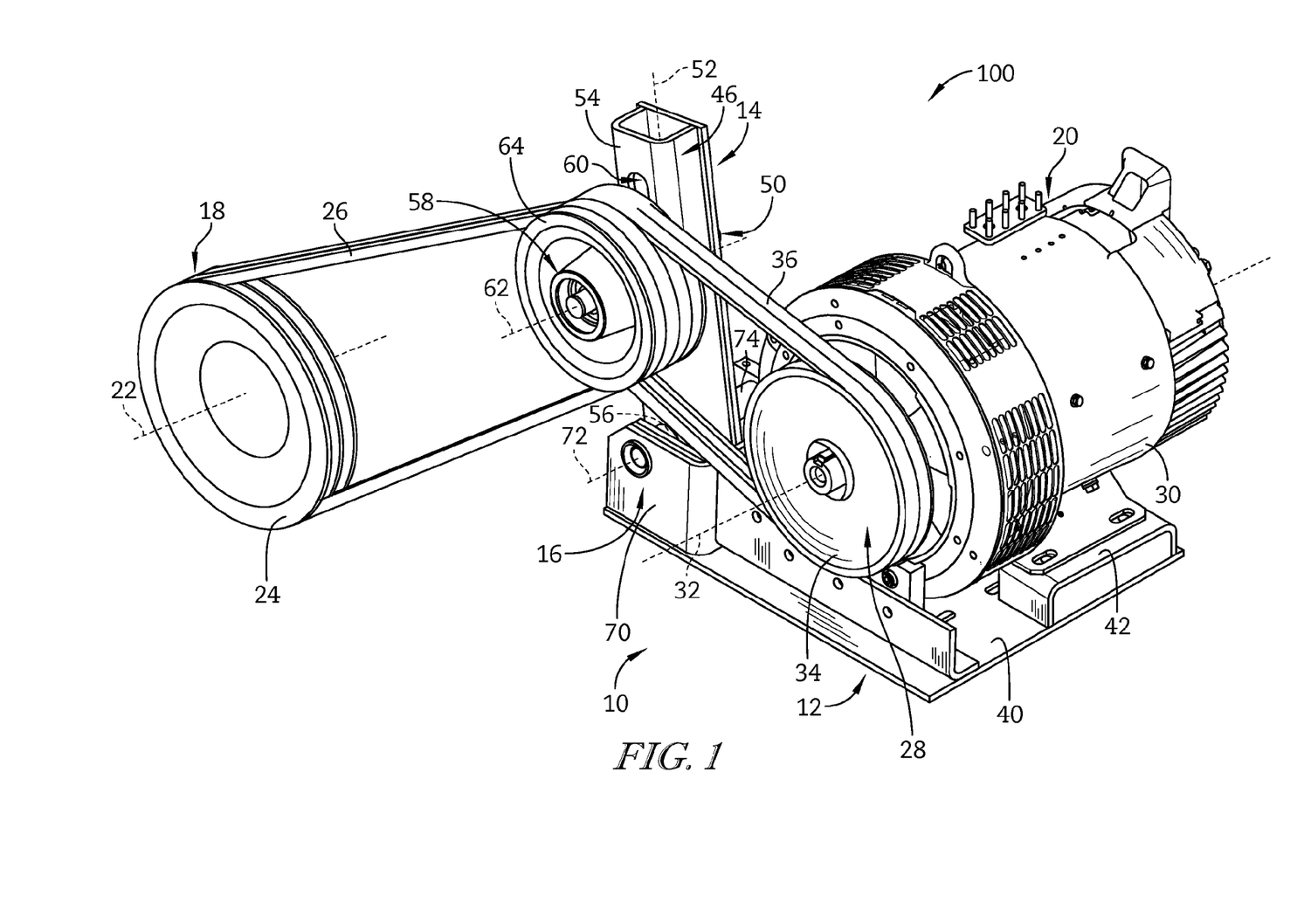
FIG. 1 is a perspective view of a tensioning system having an accessory mount employing features of the present disclosure.

FIGS. 1-5 depict an illustrative accessory mount 10 for use with a tensioning system such as, for example, an engine system 100 or motor system. Illustratively, the accessory mount 10 is included in a belt drive system included in the engine system 100 of a vehicle such as, for example, a bus. The accessory mount 10 is arranged to support an accessory system 20 (sometimes called an accessory load) such as, for example, an alternator or compressor and to maintain tension in at least one belt that couples the accessory system 20 with a drive assembly 18 included in the engine system 100 as shown in FIG. 1. In the illustrative embodiment, the accessory mount 10 maintains tension in two belts simultaneously.

In the illustrative embodiment, the engine system 100 includes the drive assembly 18, the accessory mount 10 coupled with the drive assembly 18, and the accessory system 20 as shown in FIG. 1. Illustratively, the drive assembly 18 is arranged to rotate about a drive axis 22 to produce rotational energy to power accessory system 20. The accessory mount 10 supports the accessory system 20 and transmits the rotational energy from the drive assembly 18 to the accessory system 20. The accessory system 20 consumes the rotational energy to produce auxiliary features for the vehicle such as, for example, producing electrical energy or providing a compression stage of a refrigeration cycle.

The drive assembly 18 is driven by a power source such as, for example, an internal combustion engine. The drive assembly 18 includes the drive axis 22, a drive pulley 24, and a drive belt 26 as shown in FIGS. 1 and 3-5. The drive pulley 24 is coupled with a power source such as, for example, a crankshaft and with the drive belt 26. The drive pulley 24 is arranged to rotate about the drive axis 22 to drive the drive belt 26. In the illustrative embodiment, the drive pulley 24 comprises a wheel having a center point that lies on the drive axis 22. In other embodiments, the drive belt 26 may be a rope, cord, or any other suitable alternative.

A first portion of the drive belt 26 engages a portion of an outer surface of the drive pulley 24 as shown in FIG. 1. A second portion of the drive belt 26 engages a portion of an intermediate pulley 64 included in the accessory mount 10. In operation, the drive belt 26 transmits rotational energy from the drive pulley 24 to the intermediate pulley 64 to cause the intermediate pulley 64 to rotate about an intermediate axis 62. In the illustrative embodiment, the drive belt 26 comprises a loop of material. In some embodiments, the drive belt 26 comprises a toothed belt.

The accessory system 20 is coupled with the accessory mount 10 and consumes rotational energy received from the intermediate pulley 64 to produce auxiliary features for the vehicle such as, for example, producing electrical energy or providing a compression stage of a refrigeration cycle. The accessory system 20 includes an accessory unit 30 and an input pulley assembly 28 coupled with the accessory unit 30. The input pulley assembly 28 is arranged to receive rotational energy from the intermediate pulley 64 to drive the accessory unit 30 as shown in FIGS. 1 and 3-5.

The input pulley assembly 28 includes an input axis 32, an input pulley 34, and the input belt 36 as shown in FIG. 1. The input pulley 34 is coupled with the accessory unit 30 and with the input belt 36. The input pulley 34 is arranged to rotate about the input axis 32 to drive the accessory unit 30.

In the illustrative embodiment, the input pulley 34 comprises a wheel having a center point that lies on the input axis 32. A first portion of the input belt 36 engages a portion of the intermediate pulley 64. A second portion of the input belt 36 engages a portion of the input pulley 34. In operation, the input belt 36 transmits the rotational energy from the intermediate pulley 64 to the input pulley 34 to cause the input pulley 34 to rotate about the input axis 32 to drive the accessory unit 30. In the illustrative embodiment, the input belt 36 comprises a loop of material. In some embodiments, the input belt 36 comprises a toothed belt. In other embodiments, the input belt 36 may be a rope, cord, or any other suitable alternative.

Figure 2:
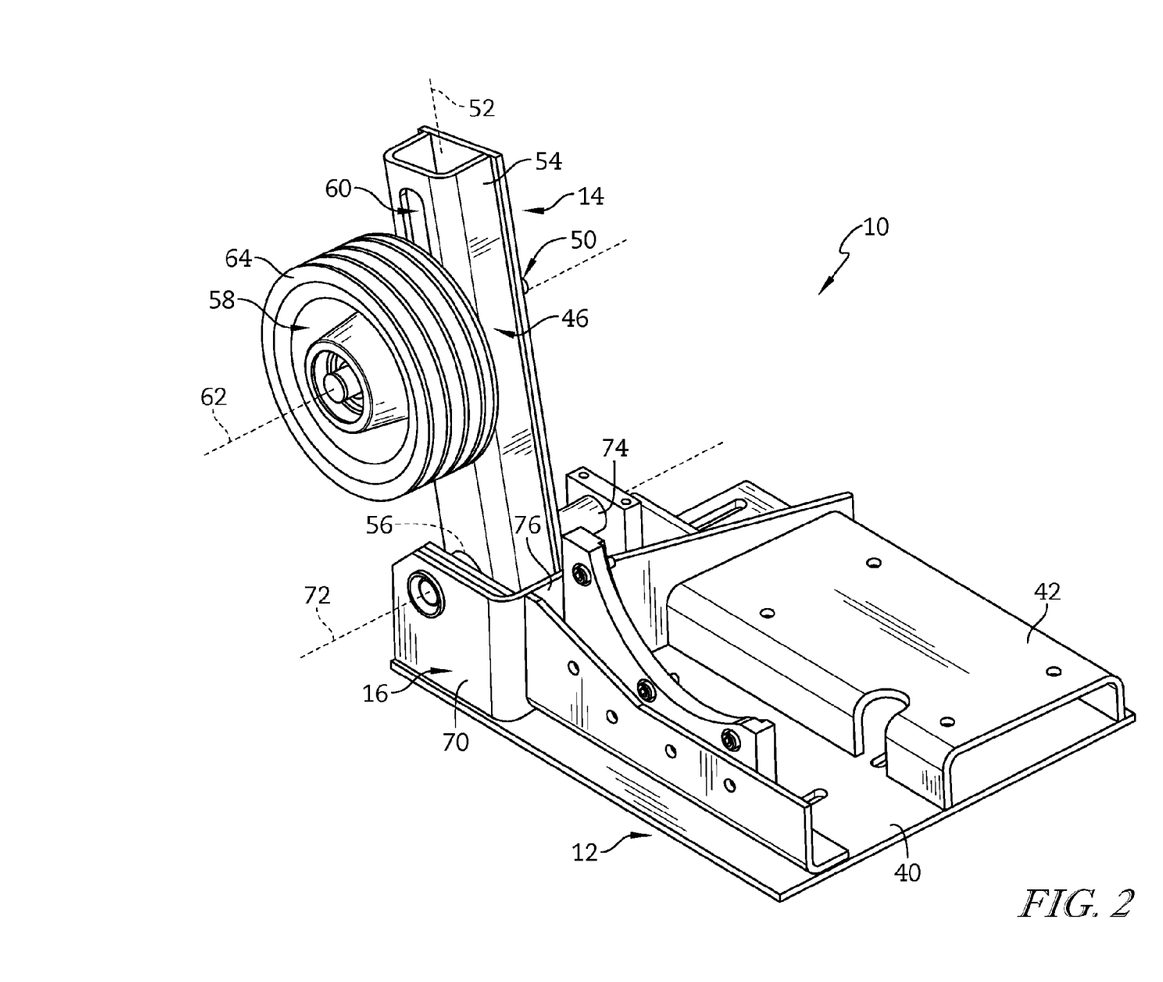
FIG. 2 is a perspective view of the accessory mount of FIG. 1.

Referring to FIGS. 1 and 2, illustratively, the accessory mount 10 includes a carriage 12, a floating arm 14, and a pivot joint 16. The carriage 12 couples the accessory unit 30 with the vehicle. The floating arm 14 is arranged to pivot relative to the carriage 12 to change the tension in the drive belt 26 and the input belt 36. Illustratively, the accessory mount 10 adjusts and maintains tension in one of the belts 26, 36 simultaneously when the other of the belts 26, 36 is adjusted. The pivot joint 16 is pivotably coupled with and supports the floating arm 14.

The carriage 12 includes a base 40 and an accessory frame 42 as shown in FIG. 1. The base 40 is arranged to couple with the vehicle. As an example, the base 40 and an internal combustion engine are coupled with a chassis of the vehicle for relative movement therewith. In the illustrative embodiment, the base 40 is generally a flat sheet of material. In other embodiments, the base 40 may have any desired shape to fit within one or more of a plurality of space limitations in the engine system 100.

In the illustrative embodiment, the carriage 12 is solid mounted with the chassis. In other embodiments, the carriage 12 is rubber mounted with the chassis. In the illustrative embodiment, the base 40 couples the accessory unit 30 with the chassis of the vehicle. In other embodiments, the base 40 couples the accessory unit 30 with the engine system 100.

The accessory frame 42 couples the accessory unit 30 with the base 40 as shown in FIG. 1. The accessory frame 42 is arranged to position the accessory unit 30 so that the input axis 32 is spaced apart from the intermediate axis 62 by a distance within a desired dimension range. As an example, the accessory frame 42 positions the accessory unit 30 so that a standard sized input belt 36 may be used to couple the intermediate pulley 64 with the input pulley 34. In the illustrative embodiment, the accessory frame 42 comprises a number of brackets. Illustratively, the brackets are welded to the base 40 and receive fasteners to couple the brackets with feet of the accessory unit 30.

Figure 4:
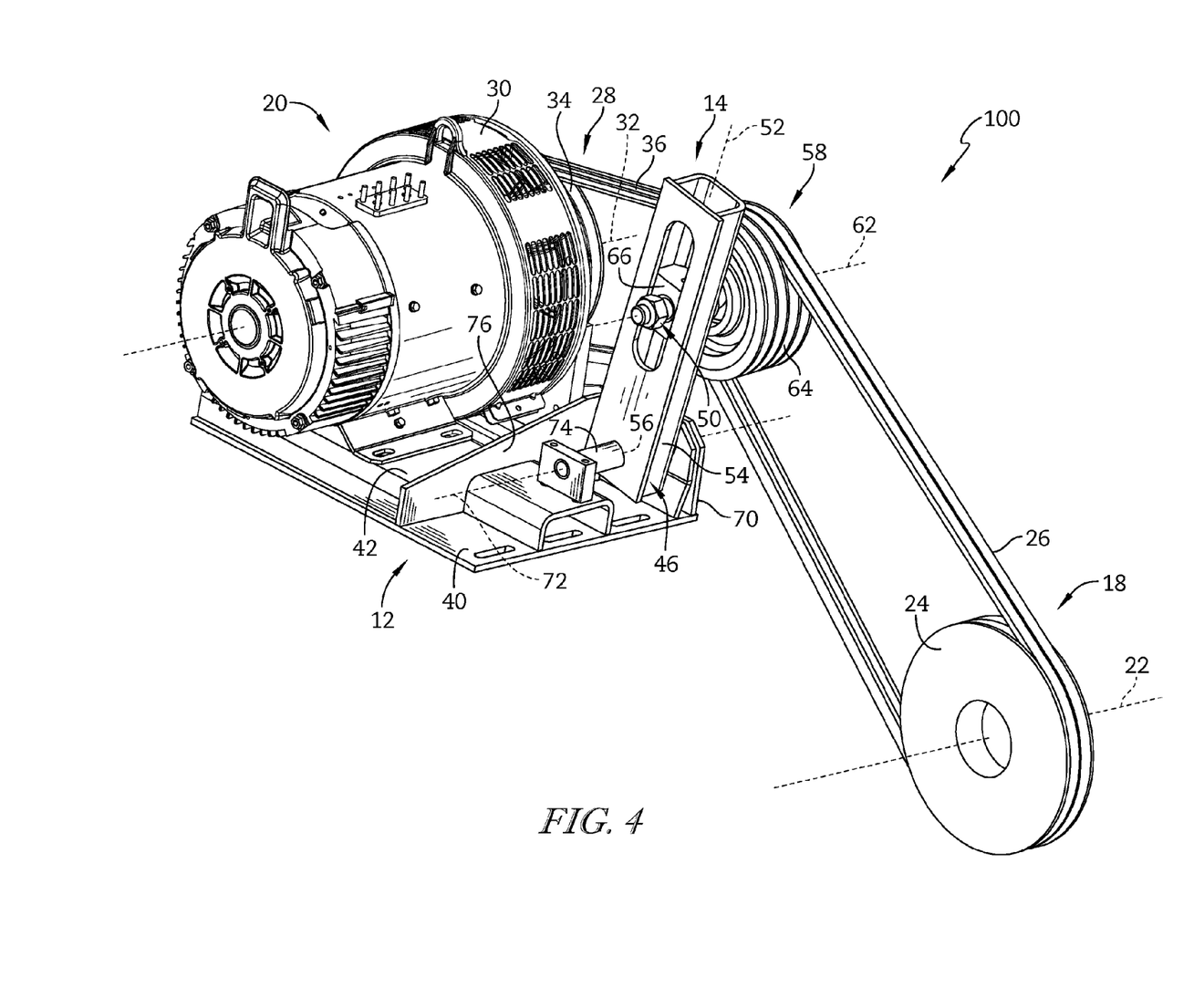
FIG. 4 is a perspective view of the tensioning system of FIG. 3.
Figure 5:
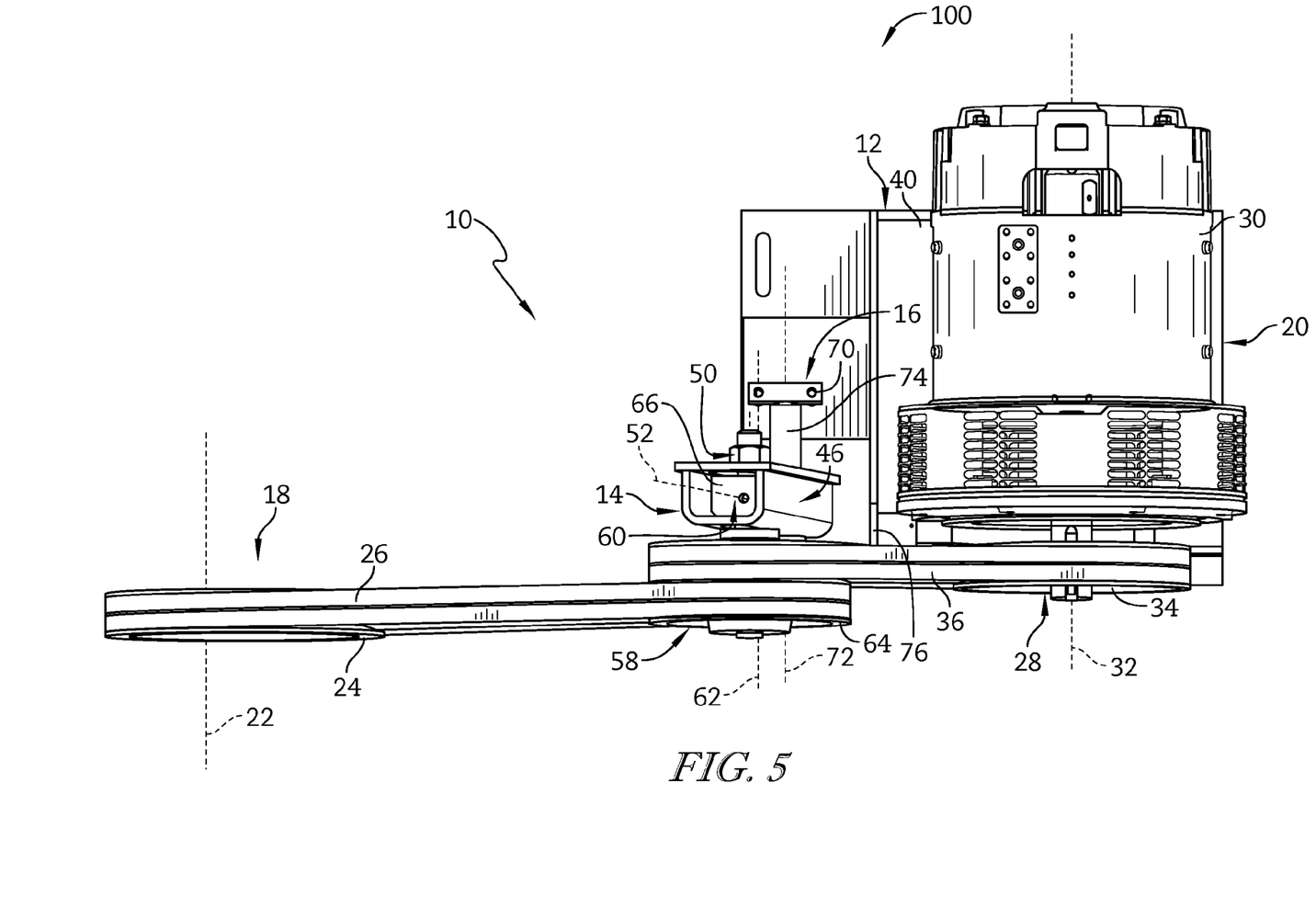
FIG. 5 is a top plan view of the tensioning system of FIG. 4.
Figure 6:
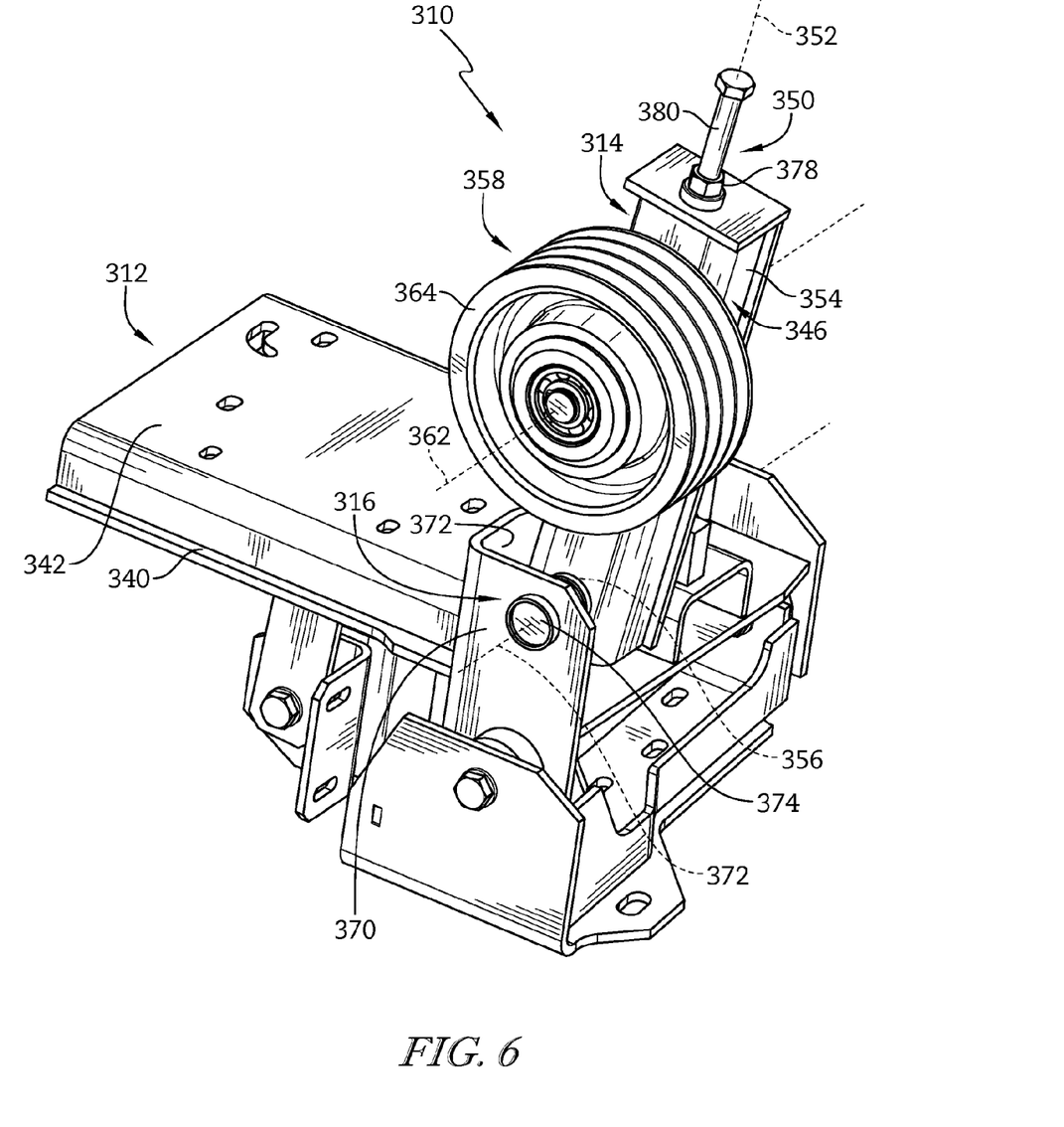
FIG. 6 is a perspective view of another embodiment of an accessory mount employing features of the present disclosure.
Figure 7:
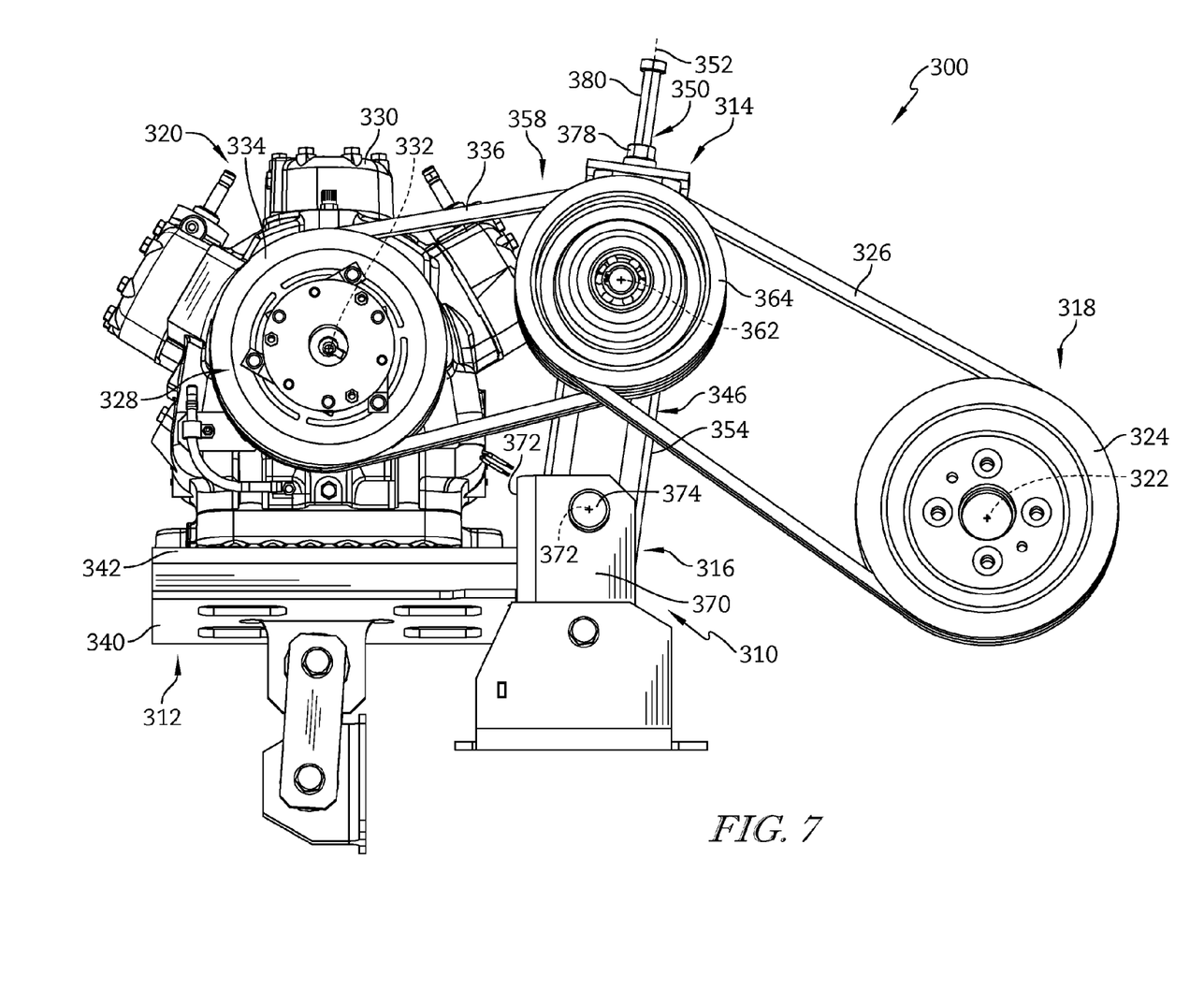
FIG. 7 is a front elevational view of a tensioning system having the accessory unit of FIG. 6.

The floating arm 14 includes an arm body 46, an intermediate pulley assembly 58, and a pulley-assembly retainer 50 as shown in FIGS. 2, 4, and 5. The arm body 46 is arranged to pivot relative to the base 40 to change the tension in the drive belt 26 and input belt 36. The intermediate pulley assembly 58 is arranged to transmit the rotational energy from the drive assembly 18 to the input pulley assembly 28. The pulley-assembly retainer 50 is arranged to position the intermediate pulley assembly 58 radially relative to a pivot axis 72 included in the pivot joint 16.

The arm body 46 has a longitudinal axis 52, an arm bracket 54, a joint-receiver passage 56, and a pulley-assembly passage 60 as shown in FIG. 1. The longitudinal axis 52 intersects with and is perpendicular to the pivot axis 72 included in the pivot joint 16. The arm bracket 54 extends along the longitudinal axis 52 and is arranged to pivot about the pivot axis 72 relative to the base 40. In the illustrative embodiment, the arm bracket 54 is arranged to pivot in both the clockwise and counterclockwise directions. The joint-receiver passage 56 is formed in the arm bracket 54 and receives the pivot joint 16 to pivotably couple the floating arm 14 with the pivot joint 16. The arm body 46 is arranged to pivot about the pivot axis 72 to change the tension in the drive belt 26 and the input belt 36.

The pulley-assembly passage 60 is formed in the arm bracket 54 and receives the intermediate pulley assembly 58 as shown in FIGS. 1 and 2. In the illustrative embodiment the pulley-assembly passage 60 is a slot that extends along the longitudinal axis 52. Illustratively, the intermediate pulley assembly 58 is allowed to move in the pulley-assembly passage 60 radially relative to the pivot axis 72 between an inner position and an outer position.

In the inner position, the intermediate pulley assembly 58 is located in the pulley-assembly passage 60 radially inward toward the pivot axis 72. In the outer position, the intermediate pulley assembly 58 is located in the pulley-assembly passage 60 radially outward away from the pivot axis 72. The intermediate pulley assembly 58 may be maintained in position in the inner position, the outer position, and a plurality of positions therebetween by the pulley-assembly retainer 50.

The intermediate pulley assembly 58 includes the intermediate axis 62, the intermediate pulley 64, and a pulley axel 66 as shown in FIG. 1. The pulley axel 66 is coupled with the arm bracket 54 and the intermediate pulley 64 to support the intermediate pulley 64. The intermediate pulley 64 is coupled with the drive belt 26 and with the input belt 36 and arranged to rotate about the intermediate axis 62 to transmit rotational energy from the drive assembly 18 to the input pulley assembly 28.

The pulley axel 66 is movable about the longitudinal axis 52 relative to the pivot axis 72 to move the intermediate pulley assembly 58 between the inner and outer position. The pulley-assembly retainer 50 is arranged to engage the pulley axel 66 to block movement of the pulley axel 66 about the longitudinal axis 52. The arm bracket 54 blocks the pulley axel 66 from rotating about the intermediate axis 62. The intermediate pulley 64 is coupled with the pulley axel 66 and arranged to rotate about the intermediate axis 62 relative to the pulley axel 66.

In the illustrative embodiment, the intermediate pulley 64 comprises a wheel having a center point that lies on the intermediate axis 62. Illustratively, the intermediate pulley 64 includes a first groove and a second groove arranged to receive the belts 26, 36 as shown in FIG. 1. The first and second grooves extend around the intermediate axis 62 circumferentially. The second groove is spaced apart from the first groove along the intermediate axis 62. In some embodiments, the first and second grooves are formed to receive teeth included in the belts 26, 36. In other embodiments, the intermediate pulley 64 includes a plurality of grooves to receive a plurality of belts.

The drive belt 26 is received in the first groove to couple the drive assembly 18 with the intermediate pulley assembly 58. In the illustrative embodiment, the drive pulley 24 and the first groove lie in a first plane as shown in FIG. 5. The drive axis 22 and the intermediate axis 62 are about parallel. The drive axis 22 and the intermediate axis 62 are about perpendicular with the first plane.

The input belt 36 is received in the second groove to couple the input pulley assembly 28 with the intermediate pulley assembly 58 as shown in FIG. 1. In the illustrative embodiment, the input pulley 34 and the second groove lie in a second plane as shown in FIG. 5. The input axis 32 and the intermediate axis 62 are about parallel. The input axis 32 and the intermediate axis 62 are about perpendicular with the second plane.

The pulley-assembly retainer 50 is coupled with the intermediate pulley assembly 58 to position the intermediate pulley assembly 58 radially along the longitudinal axis 52 as suggested in FIG. 1. The intermediate pulley assembly 58 is movable selectively between the inner and outer positions. The pulley-assembly retainer 50 is arranged to engage the pulley axel 66 and the arm body 46 to block the intermediate pulley assembly 58 from moving away from a selected position while allowing the intermediate pulley 64 to rotate about the intermediate axis 62 relative to the arm body 46.

In the illustrative embodiment, the pulley-assembly retainer 50 comprises a fastener that extends along the intermediate axis 62 and is coupled with the pulley axel 66 as shown in FIG. 4. The fastener is loosened to allow the intermediate pulley assembly 58 to move between the inner and outer positions. After the intermediate pulley assembly 58 is moved to the desired location, the fastener is tightened to engage the arm body 46 to block the intermediate pulley assembly 58 from moving radially relative to the pivot axis 72.

In other embodiments, the pulley-assembly retainer 50 comprises a biasing member to maintain the position of the intermediate pulley assembly 58. As an example, a spring extending along the longitudinal axis 52 is coupled with the arm body 46 and the intermediate pulley assembly 58. In one embodiment, the spring biases the intermediate pulley assembly 58 into the upper position. In another embodiment, the spring biases the intermediate pulley assembly 58 into the lower position. In other embodiments, the pulley-assembly retainer 50 comprises an actuator. As an example, the actuator is coupled with the arm body 46 and the intermediate pulley assembly 58. The actuator is arranged to move the intermediate pulley assembly 58 radially along the longitudinal axis 52 between the inner and outer positions.

In some embodiments, the actuator comprises a pneumatic actuator. In other embodiments, the actuator comprises a hydraulic actuator.

The pivot joint 16 includes a joint bracket 70, the pivot axis 72, and a pivot member 74 as shown in FIGS. 1 and 2. The joint bracket 70 is coupled with the base 40 for movement therewith. The pivot axis 72 extends through the joint bracket 70. In the illustrative embodiment, the pivot axis 72 is about parallel with the intermediate axis 62. The pivot member 74 is coupled with the joint bracket 70 and extends along the pivot axis 72.

The pivot member 74 extends through the joint-receiver passage 56 formed in the arm body 46. The pivot member 74 blocks the arm body 46 from pivoting about the longitudinal axis 52. In the illustrative embodiment, the pivot member 74 is coupled with the joint bracket 70 and is arranged to pivot relative to the joint bracket 70 about the pivot axis 72. The pivot member 74 is coupled with the arm body 46 and arranged to pivot with the arm body 46 about the pivot axis 72.

In other embodiments, the pivot member 74 is coupled with the joint bracket 70 and blocked from pivoting about the pivot axis 72 relative to the joint bracket 70. As such, the arm body 46 is coupled with the pivot member 74 and arranged to pivot about the pivot axis 72 relative to the pivot member 74.

In operation, the accessory mount 10 is coupled with a chasis of a vehicle and the accessory system 20 is coupled with the accessory frame 42. The intermediate pulley assembly 58 is moved to the inner position. The input belt 36 is coupled with the input pulley 34 and the intermediate pulley 64. The drive belt 26 is coupled with the drive pulley 24 and the intermediate pulley 64.

The intermediate pulley assembly 58 is moved radially outward away from the inner position toward the outer position to a selected position to apply a tension force to both the input belt 36 and the drive belt 26. In some embodiments, a tension meter is used to measure the tension in the belts 26, 36 and the intermediate pulley assembly 58 is moved radially outward until a desired tension in belts 26, 36 is achieved. The pulley-assembly retainer 50 engages the intermediate pulley assembly 58 to block the intermediate pulley assembly 58 from radial movement away from the selected position and to maintain the tension force on the input belt 36 and the drive belt 26.

Figure 3:
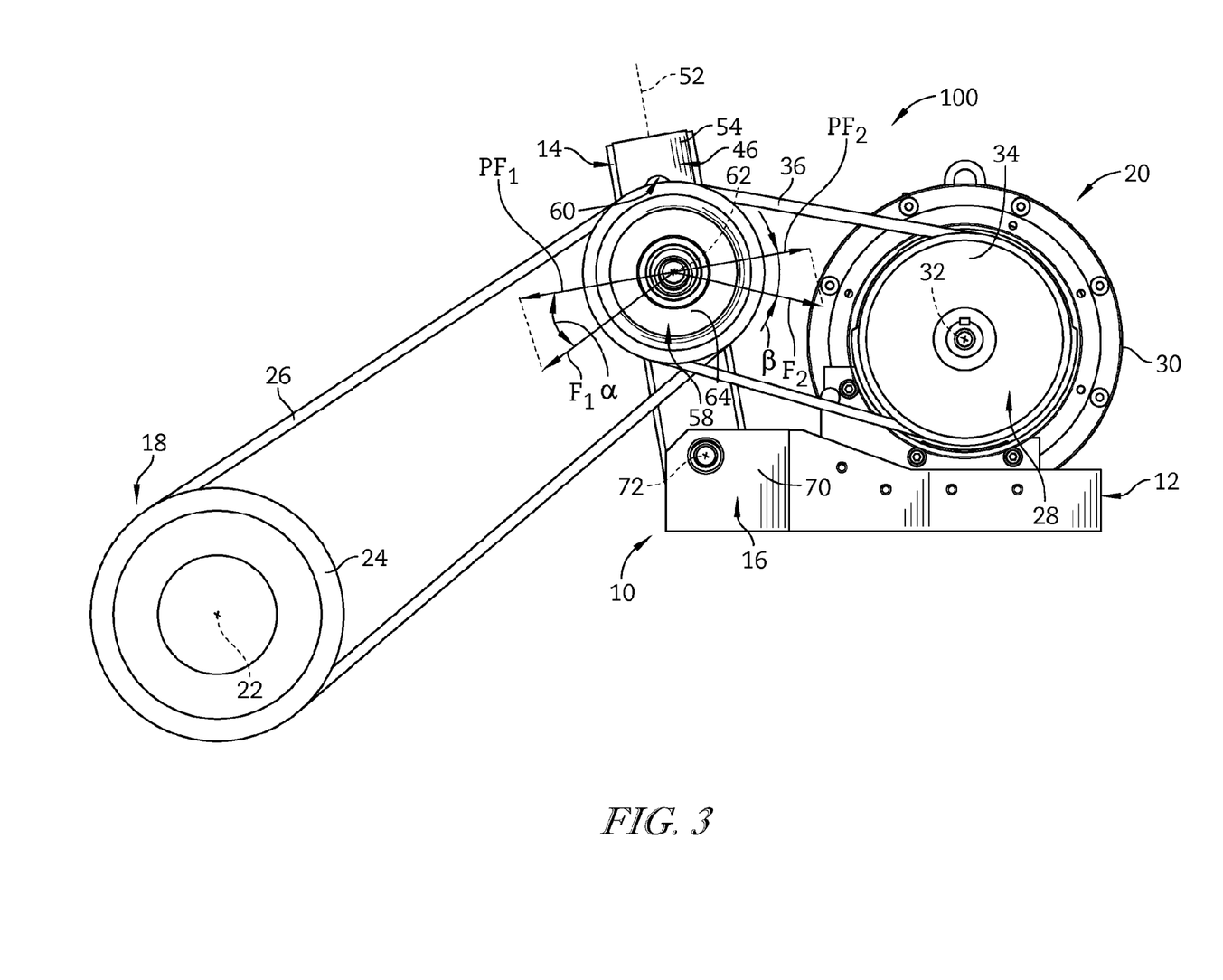
FIG. 3 is a front elevational view of the tensioning system of FIG. 1.

Referring to FIG. 3, the drive belt 26 applies a first force $F_1$ to the intermediate pulley assembly 58 and, thus, to the arm body 46. The first force F1 and the arm body 46 define an angle $\alpha$ therebetween. A perpendicular portion $PF_1$ of the first force $F_1$ that is perpendicular to the longitudinal axis 52 applies a first moment to the arm body 46 in the counter-clockwise direction. The perpendicular portion $PF_1$ is related to the first force $F_1$ according to the equation $PF_1=F_1\times\cos(\alpha)$.

The input belt 36 applies a second force $F_2$ to the intermediate pulley assembly 58 and, thus, to the arm body 46 as shown in FIG. 3. The second force $F_2$ and the arm body 46 define an angle $\beta$ therebetween. A perpendicular portion $PF_2$ of the second force $F_2$ that is perpendicular to the longitudinal axis 52 applies a second moment to the arm body 46 in the clockwise direction. The perpendicular portion $PF_2$ is related to the second force $F_2$ according to the equation $PF_2=F_2\times\cos(\beta)$.

If the first moment is greater than the second moment, the arm body 46 pivots about the pivot axis 72 toward the drive assembly 18. As the arm body 46 pivots, the tension in the drive belt 26 is reduced and, thus, the first force $F_1$ is reduced. The tension in the input belt 36 is increased and, thus, the second force $F_2$ is increased. The arm body 46 pivots about the pivot axis 72 toward the drive assembly 18 until the perpendicular portions $PF_1$, $PF_2$ of the first and second forces $F_1$, $F_2$ are equal. When the perpendicular portions $PF_1$, $PF_2$ of the first and second forces $F_1$, $F_2$ are equal, the floating arm 14 is maintained in position and the accessory mount 10 maintains the desired tension in both the drive belt 26 and the input belt 36.

If the second moment is greater than the first moment, the arm body 46 pivots about the pivot axis toward the input pulley assembly 28. As the arm body 46 pivots, the tension in the input belt 36 is reduced and, thus, the second force $F_2$ is reduced. The tension in the drive belt 26 is increased and, thus, the first force $F_1$ is increased. The arm body 46 pivots about the pivot axis 72 toward the input pulley assembly 28 until the perpendicular portions $PF_1$, $PF_2$ of the first and second forces $F_1$, $F_2$ are equal. When the perpendicular portions $PF_1$, $PF_2$ of the first and second forces $F_1$, $F_2$ are equal, the floating arm 14 is maintained in position and the accessory mount 10 maintains the desired tension in both the drive belt 26 and the input belt 36.

Diameters of the pulleys 24, 34, 64, the geometry of the belt arrangement, and an angle of the arm body 46 are factored into the design of the accessory mount 10 to cause the perpendicular portions $PF_1$, $PF_2$ to be equal. The result is a balanced floating arm 14 that maintains a desired ratio of tension between the drive assembly 18 and the input pulley assembly 28 while minimizing user interaction.

If any of the drive assembly 18, the intermediate pulley assembly 58, and the input pulley assembly 28 move during operation, the first and second forces $F_1$, $F_2$ will act on the floating arm 14 to reduce the change of tension distributed between both the drive belt 26 and the input belt 36. As an example, one or more of the drive assembly 18, the intermediate pulley assembly 58, and the input pulley assembly 28 may move due to vibrations of the vehicle or due to uneven road terrain. In embodiments where the pulley-assembly retainer 50 comprises a biasing member, the biasing member may cause the tension distribution to self-correct during the movement and after the movement.

If one of the drive belt 26 or the input belt 36 deform, the tension applied to the deformed belt may decrease. The accessory mount 10 will distribute the loss of tension between the drive belt 26 and the input belt 36. As an example, if the input belt 36 stretches and the tension applied to the belt is reduced. The decreased tension causes the perpendicular portion of the force applied to the intermediate pulley 64 to be reduced. As a result, the perpendicular portion of the force applied by the drive belt will cause the floating arm 14 to move toward the drive pulley 24. As the floating arm 14 moves toward the drive pulley 24, the tension applied to the input belt 36 increases and the tension applied to the drive belt 26 decreases.

A method 200 of using the accessory mount 10 includes a number of steps. In a first step 202, the engine system 100 including the drive assembly 18, the accessory mount 10, and the accessory system 20 are provided. In a second step 204, the intermediate pulley assembly 58 is moved to the lower position. In a third step 206, the input belt 36 is coupled with the input pulley 34 and the intermediate pulley 64. In a fourth step 208, the drive belt 26 is coupled with the drive pulley 24 and the intermediate pulley 64. In a fifth step 210, the intermediate pulley assembly 58 is moved radially outward away from the inner position toward the outer position to a selected position to apply a tension force to both the input belt 36 and the drive belt 26. In a sixth step 212, the pulley-assembly retainer 50 engages the intermediate pulley assembly 58 and the arm body 46 to block the intermediate pulley assembly 58 from radial movement away from the selected position and to maintain the tension force on the input belt 36 and the drive belt 26.

In some embodiments, the pivot joint 16 further includes an arm blocker 76. The arm blocker 76 is arranged to maintain the position of the arm body 46 relative to the carriage 12. The arm body 46 is arranged to pivot about the pivot axis 72 between a first position and a second position. In the first position, the arm body 46 is pivoted about the pivot axis 72 toward the drive assembly 18. In the second position, the arm body 46 is pivoted about the pivot axis 72 toward the input pulley assembly 28. The arm blocker 76 is arranged to block selectively the arm body 46 from pivoting about the pivot axis 72 to maintain the arm body 46 in the first position, second position, or a plurality of positions therebetween.

In some embodiments, the arm blocker 76 comprises a crank system that is turned to cause the arm body 46 to pivot. The crank system includes teeth that engage the arm body 46 to block the arm body 46 from pivoting about the pivot axis 72 when the crank system is not being turned. In other embodiments, the pivot joint 16 includes an arm blocker 376 as shown in FIG. 8.

Another illustrative accessory mount 310 for use in the engine system 300 is shown in FIGS. 6-9. The accessory mount 310 is substantially similar to the accessory mount 10 shown in FIGS. 1-5 and described herein. Accordingly, similar reference numbers in the 300 series indicate features that are common between the accessory mount 10 and the accessory mount 310. The description of the accessory mount 10 is hereby incorporated by reference to apply to the accessory mount 310, except in instances when it conflicts with the specific description and drawings of the accessory mount 310. Additionally, similar reference numbers in the 300 series indicate features that are common between the engine system 100 and the engine system 300. The description of the engine system 100 is hereby incorporated by reference to apply to the engine system 300, except in instances when it conflicts with the specific description and drawings of the engine system 300.

Figure 8:
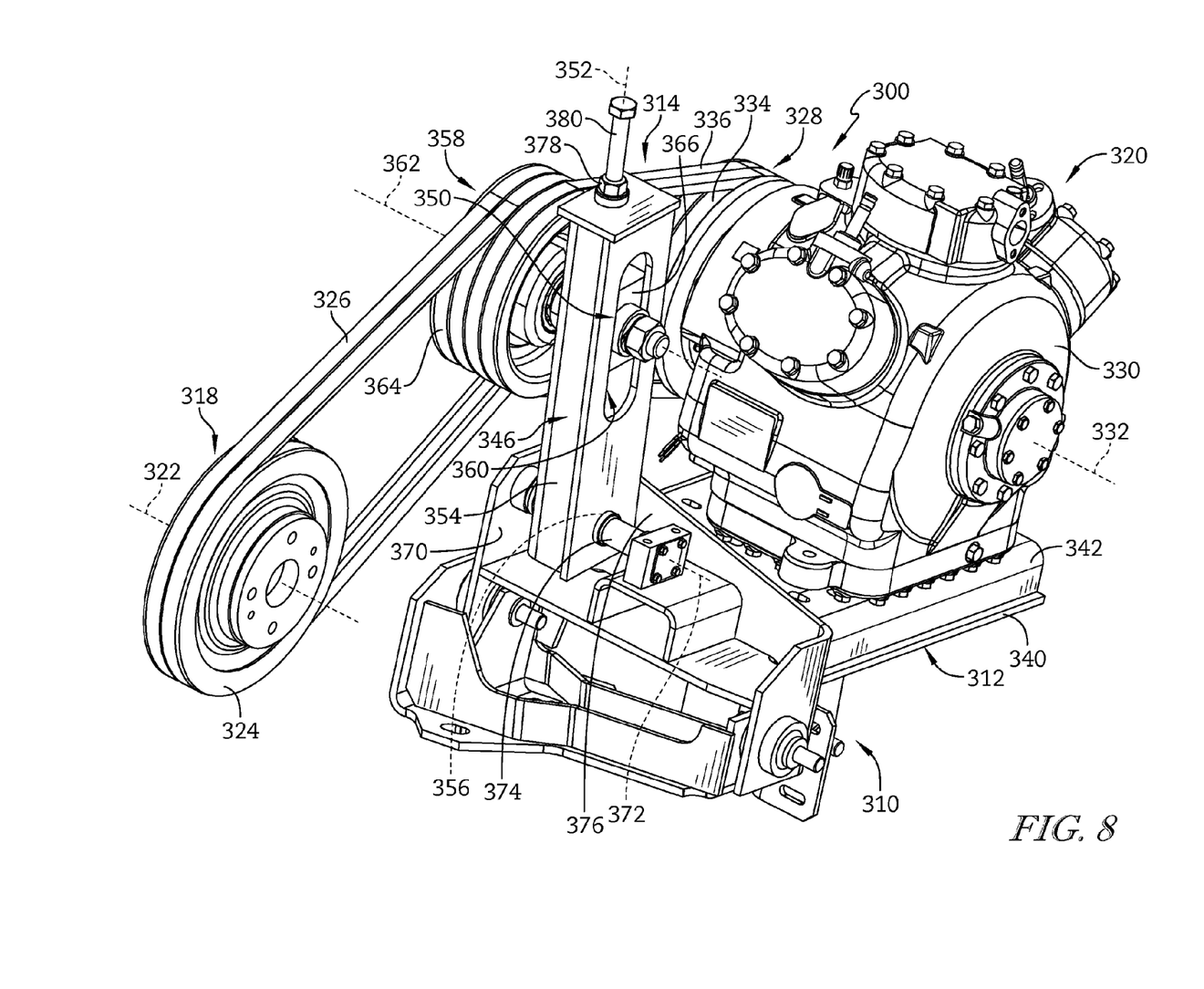
FIG. 8 is a perspective view of the tensioning system of FIG. 7.
Figure 9:
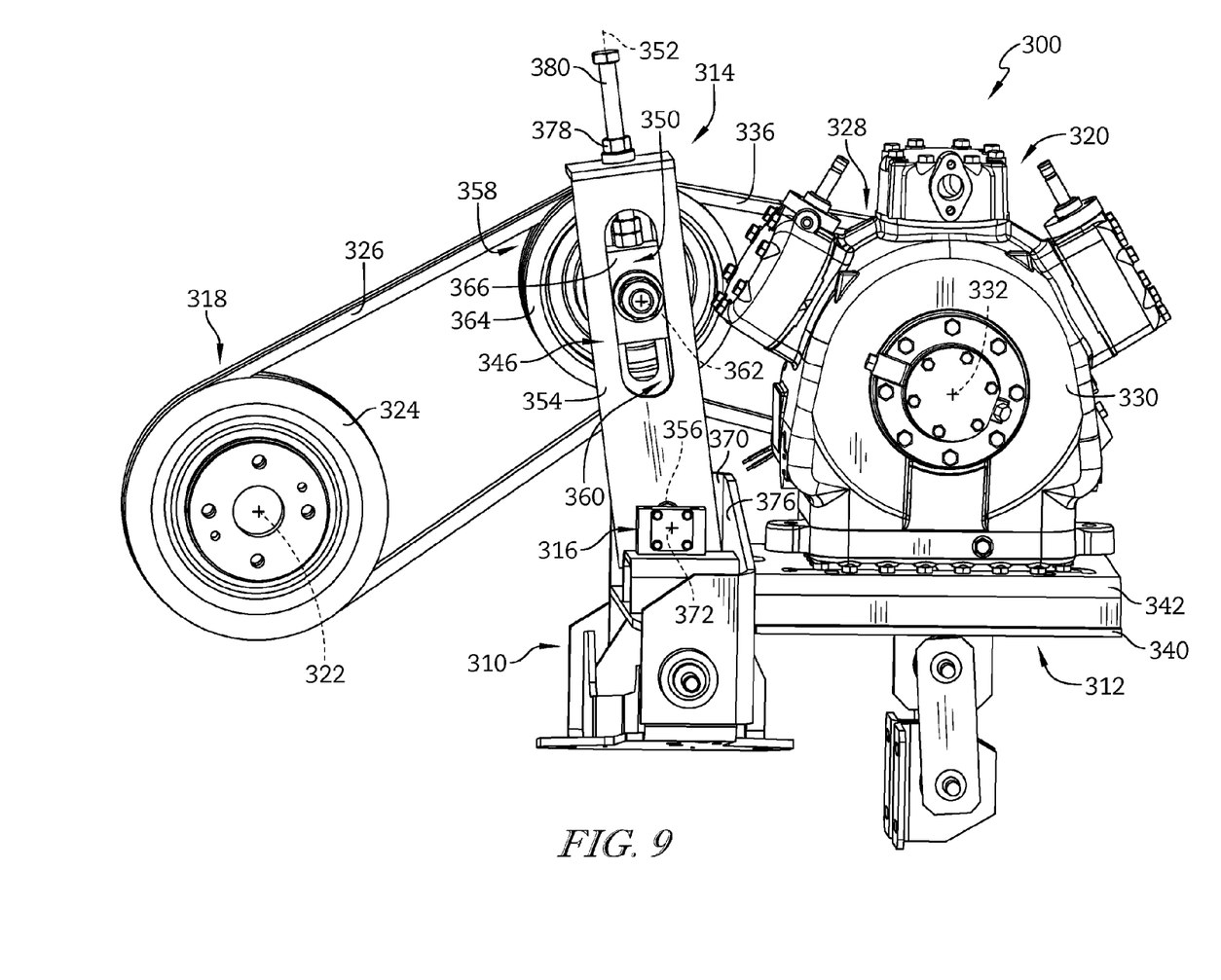
FIG. 9 is a rear elevation view of the tensioning system of FIG. 7.

The floating arm 314 of the accessory mount 310 includes a pulley-assembly retainer 350 as shown in FIG. 8. The pulley-assembly retainer 350 includes a rod 380 and fasteners 378. The rod 380 is coupled with the arm body 46 and the pulley axel 366. The rod 380 extends along the longitudinal axis 352.

The pulley axel 366 is coupled with the intermediate pulley 364 and the rod 380. The intermediate pulley 364 is arranged to move radially with the pulley axel 366 relative to the pivot axis 372. The intermediate pulley 364 is arranged to rotate relative to the pulley axel 366 and the arm body 346.

The fastener 378 blocks selectively radial movement of the pulley axel 366 along the longitudinal axis 352. The fastener 378 is loosened to allow the rod 380 and the pulley axel 366 to move radially relative to the pivot axis 372. As the pulley axel 366 moves, the intermediate pulley assembly 358 moves in the pulley-assembly passage 360 between the inner and outer positions. After the intermediate pulley assembly 358 is moved to the desired location, the fastener 378 is tightened to engage the arm body 346 and the rod 380 to block the pulley axel 366 and, thus, the intermediate pulley 364 from moving radially relative to the pivot axis 372.

The pivot joint 316 further includes an arm blocker 376. The arm blocker 376 is arranged to maintain the position of the arm body 346 relative to the carriage 312. The arm body 346 is arranged to pivot about the pivot axis 372 between a first position and a second position. In the first position, the arm body 346 is pivoted about the pivot axis 372 toward the drive assembly 318. In the second position, the arm body 346 is pivoted about the pivot axis 372 toward the input pulley assembly 328.

The arm blocker 376 comprises upright members that block the arm body 346 from pivoting beyond the first position or the second position. As an example, if one of the belts 326, 336 uncouples from the accessory mount 310, the floating arm 314 may be pulled toward the engine or the accessory unit 330. The upright members are arranged to engage the floating arm 314 and to block the floating arm 314 from contacting the engine or accessory unit 330.

It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A tensioning system comprising:
   a drive assembly including a drive pulley and a drive belt coupled with the drive pulley,
   an accessory system having an input pulley assembly including an input pulley and an input belt coupled with the input pulley, and
   a mount assembly coupled with the drive belt and the input belt, the mount assembly includes a floating arm arranged to move toward one of the drive pulley and the input pulley in response to a force applied to the floating arm by one of the drive belt and the input belt to change tension in at least one of the drive belt and the input belt without changing a transmission ratio of the drive belt and the input belt.

2. The tensioning system of claim 1 wherein the mount assembly further includes a carriage and a pivot joint coupled with the carriage, and wherein the floating arm is pivotably coupled with the pivot joint.

3. The tensioning system of claim 2 wherein the floating arm is coupled with the drive belt and the input belt and the floating arm is arranged to pivot about a pivot axis included in the pivot joint to change tension in the drive belt and the input belt.

4. The tensioning system of claim 2 wherein the pivot joint includes a pivot axis, the floating arm is arranged to pivot about the pivot axis toward the drive pulley in response to a first force applied to the floating arm by the drive belt and to pivot about the pivot axis toward the input pulley in response to a second force applied to the floating arm by the input belt.

5. The tensioning system of claim 4 wherein the floating arm includes a longitudinal axis and an arm body, the longitudinal axis intersects with and extends away from the pivot axis, and the arm body extends along the longitudinal axis and is arranged to pivot about the pivot axis.

6. The tensioning system of claim 5 wherein the first force includes a first perpendicular portion that is perpendicular to the longitudinal axis, the second force includes a second perpendicular portion that is perpendicular to the longitudinal axis, and the arm body is arranged to pivot about the pivot axis until the first perpendicular portion is equal to the second perpendicular portion.

7. The tensioning system of claim 5 wherein the floating arm further includes an intermediate pulley assembly and a pulley-assembly passage formed in the arm body, the intermediate pulley assembly is coupled with the drive belt and the input belt, the pulley-assembly passage comprises an elongated slot extending along the longitudinal axis, the intermediate pulley assembly is arranged to move in the pulley-assembly passage between an inner position in which the intermediate pulley assembly is located in the pulley-assembly passage radially inward toward the pivot axis and an outer position in which the intermediate pulley assembly is located in the pulley-assembly passage radially outward away from the pivot axis.

8. The tensioning system of claim 7 wherein the floating arm applies a first tension to the drive belt and the input belt when the input pulley assembly is in the inner position and a second tension to the drive belt and the input belt when the intermediate-pulley assembly is in the outer position, the second tension being greater than the first tension.

9. The tensioning system of claim 2 wherein the accessory system is coupled with the carriage.

10. The tensioning system of claim 1 wherein the accessory system includes an accessory unit and the input pulley assembly is coupled with the accessory unit and the input pulley assembly is arranged to receive rotational energy to power the accessory unit.

11. The tensioning system of claim 10 wherein the input pulley assembly includes the input pulley, the input belt, and an input axis, the input pulley is coupled with the accessory unit, and the input pulley is arranged to rotate about the input axis to power the accessory unit.

12. An accessory mount for use with a tensioning system, the accessory mount comprising:
a carriage,
a pivot joint coupled with the carriage, and
a floating arm coupled with the pivot joint, the floating arm including an arm body and an intermediate pulley assembly coupled to the arm body and configured to rotate relative to the arm body, the intermediate pulley assembly arranged to couple with a first and a second belt of the tensioning system, and wherein the arm body is free to pivot relative to the pivot joint in response to a tension force applied to the intermediate pulley assembly by at least one of the first and second belts.

13. The accessory mount of claim 12 wherein the floating arm includes a longitudinal axis and an arm body, the longitudinal axis intersects with and extends away from the pivot axis, and the arm body extends along the longitudinal axis and is arranged to pivot about the pivot axis, the arm body further including an arm bracket extending along the longitudinal axis and a joint-receiver passage formed in the arm bracket.

14. The accessory mount of claim 13 wherein the pivot joint includes a pivot axis and the pivot axis extends through the joint-receiver passage; wherein the pivot axis is about perpendicular to the longitudinal axis; wherein the arm body further includes a pulley-assembly passage formed in the arm bracket and an intermediate pulley assembly extending through the pulley-assembly passage; wherein the intermediate pulley assembly includes an intermediate axis and an intermediate pulley arranged to rotate about the intermediate axis.

15. The accessory mount of claim 14 wherein the intermediate pulley includes a first groove and a second groove spaced apart from the first groove along the intermediate axis, the first and second grooves extend circumferentially around the intermediate axis; wherein the pulley-assembly passage comprises an elongated slot extending along the longitudinal axis, the intermediate pulley assembly is arranged to move in the pulley-assembly passage between an inner position in which the intermediate pulley assembly is located in the pulley-assembly passage radially inward toward the pivot axis and an outer position in which the intermediate pulley assembly is located in the pulley-assembly passage radially outward away from the pivot axis.

16. The accessory mount of claim 15 wherein the floating arm further includes a pulley-assembly retainer coupled with the intermediate pulley assembly and the pulley-assembly retainer is arranged to block selectively movement of the intermediate pulley assembly away from the selected position; wherein the pulley-assembly retainer comprises a fastener coupled with the intermediate pulley assembly; wherein the fastener engages the arm bracket to block radial movement of the intermediate pulley assembly and disengages the arm bracket to allow radial movement of the intermediate pulley assembly; and wherein the pulley-assembly retainer comprises a rod, a pulley axle, and a fastener; and wherein the rod extends along the longitudinal axis and is coupled with the arm body and the pulley axle, the pulley axle is coupled with the intermediate pulley assembly and the rod, the intermediate pulley assembly is arranged to move radially with the pulley axle relative to the pivot axis, the intermediate pulley assembly is arranged to rotate relative to the pulley axle and the arm body, and the fastener blocks selectively radial movement of the pulley axle along the longitudinal axis.

17. A method of using an accessory mount in a tensioning system, the method comprising:
providing a drive assembly, an accessory mount, and an accessory system coupled with the accessory mount, the accessory mount including a pivot joint and a floating arm, the floating arm including an arm body coupled with the pivot joint to pivot about a pivot axis of the pivot joint and an intermediate pulley assembly extending through the arm body,
coupling a drive belt with a drive pulley of the drive assembly and the intermediate pulley assembly,
coupling an input belt with the accessory system and the intermediate pulley assembly, and
pivoting the arm body about the pivot axis to cause the intermediate pulley assembly to change a tension applied to the drive belt and the input belt by the intermediate pulley without changing a transmission ratio of the drive belt and the input belt.

18. The method of claim 17 wherein the arm body is formed to include a pulley-assembly passage, the intermediate pulley assembly extends through the pulley-assembly passage, the intermediate pulley assembly movable in the pulley-assembly passage between an inner position in which the intermediate pulley assembly is located in the pulley-assembly passage radially toward the pivot axis and an outer position in which the intermediate pulley assembly is located in the pulley-assembly passage radially away from the pivot axis; and further comprising moving the intermediate pulley assembly from the inner position toward the outer position to change the tension applied to the drive belt and input belt.

19. The method of claim 18 wherein the intermediate pulley assembly is moved from the inner position toward the outer position to increase the tension in the drive belt and input belt; and further comprising blocking radial movement of the intermediate pulley assembly relative to the pivot axis.

* * * * *